(12) United States Patent
Jang et al.

(10) Patent No.: US 10,215,839 B2
(45) Date of Patent: Feb. 26, 2019

(54) POSE DETECTION DEVICE OF MOVABLE BODY AND LOCATION-BASED SUPPLEMENTAL SERVICE PROVIDING SYSTEM

(71) Applicant: Polariant, Inc., Seoul (KR)

(72) Inventors: Hyouk Jang, Cheongju (KR); Hyeon Gi Jeon, Cheongju (KR); Youngjae Choi, Seoul (KR)

(73) Assignee: Polariant, Inc., Seoul (KR)

( * ) Notice: Subject to any disclaimer, the term of this patent is extended or adjusted under 35 U.S.C. 154(b) by 67 days.

(21) Appl. No.: 15/383,063

(22) Filed: Dec. 19, 2016

(65) Prior Publication Data

US 2017/0102449 A1 Apr. 13, 2017

Related U.S. Application Data

(63) Continuation-in-part of application No. PCT/KR2015/006528, filed on Jun. 26, 2015.

(30) Foreign Application Priority Data

Jun. 27, 2014 (KR) ........................ 10-2014-0079934

(51) Int. Cl.
*G01S 5/16* (2006.01)
*G01B 11/26* (2006.01)
(Continued)

(52) U.S. Cl.
CPC ................ *G01S 5/16* (2013.01); *G01B 11/00* (2013.01); *G01B 11/26* (2013.01); *G01C 21/206* (2013.01); *H04W 4/02* (2013.01)

(58) Field of Classification Search
CPC .......... G01S 5/16; G01S 5/0009; G01S 17/48; G01B 11/26
See application file for complete search history.

(56) References Cited

U.S. PATENT DOCUMENTS 5,819,207 A 10/1998 Takagi
6,459,092 B2 10/2002 Cho
(Continued)

FOREIGN PATENT DOCUMENTS

JP 9-163268 A 6/1997
JP 2001-060140 A 3/2001
(Continued)

OTHER PUBLICATIONS

WIPO, ISA/KR, International Search Report in Int'l App. No. PCT/KR2015/012813, dated Mar. 16, 2016.
(Continued)

*Primary Examiner* — Maurice Smith
(74) *Attorney, Agent, or Firm* — John H. Choi & Associates LLC

(57) ABSTRACT

Embodiments herein disclose a pose detection device for a movable body and a location-based supplemental service providing system. The pose detection device includes a first polarization unit and a second polarization unit positioned to have transmission axis difference values different from each other, wherein the first polarization unit and the second polarization unit receiving light emitted from a polarized light source located beyond and apart from the first polarization unit and the second polarization unit. Further, the pose detection device includes a first illuminometer measures positioned below the first polarization unit and a second illuminometer positioned below the second polarization unit. Further, the pose detection device includes a an interpretation unit generating pose information of the movable body based on detected light variation curves for the first polarization unit and the second polarization unit and illumination values measured by the first illuminometer and the second illuminometer.

8 Claims, 5 Drawing Sheets

(51) Int. Cl.
 *G01B 11/00* (2006.01)
 *H04W 4/02* (2018.01)
 *G01C 21/20* (2006.01)

(56) References Cited

U.S. PATENT DOCUMENTS

| 2005/0285946 | A1 | | 12/2005 | Raynor |
| 2012/0313812 | A1 | | 12/2012 | Rastegar |
| 2013/0310081 | A1 | * | 11/2013 | Chu ..................... H04W 4/025 455/456.3 |
| 2015/0276391 | A1 | * | 10/2015 | Murase ..................... G01S 5/16 356/138 |

FOREIGN PATENT DOCUMENTS

| JP | 2007-127567 A | | 5/2007 |
| JP | WO2014061079 A1 | * | 4/2014 |

OTHER PUBLICATIONS

WIPO, ISA/KR, Written Opinion in Int'l App. No. PCT/KR2015/012813, dated Mar. 16, 2016.

* cited by examiner

POSE DETECTION DEVICE OF MOVABLE BODY AND LOCATION-BASED SUPPLEMENTAL SERVICE PROVIDING SYSTEM

CROSS-REFERENCE TO RELATED APPLICATIONS

This application is a continuation-in-part of PCT Application No. PCT/KR2015/006528, filed on Jun. 26, 2015, which is based on and claims priority to Korean Patent Application No. 10-2014-0079934 filed on Jun. 27, 2014, the disclosures of which are hereby incorporated by reference.

TECHNICAL FIELD

The present invention relates to a pose detection device of a movable body and a location-based supplemental service providing system.

BACKGROUND

A location based service (LBS) is a service that determines a position of a user through a localization technique and provides various information or services based on the determined position of the user. Research into the location based service has been in active progress with the advent of smart phones having functions of a GPS, a terrestrial magnetic sensor, a camera, an RFID, or the like.

The location based service researched in the related art primarily relates to an outdoor localization system such as a localization technique using the GPS and a mobile communication network, a localization technique, or the like.

However, the outdoor localization system is not suitable in an indoor environment which requires accuracy estimation of location of the user. The reason is that accurate indoor localization is difficult due to influence of signal interference by an indoor structure such as a wall or the like indoors even though the outdoor localization system guarantees proper estimation of the location.

In order to solve the problem, Korean Patent Publication No. 2014-0055109 titled "Apparatus and Method for Identifying Location of Mobile Node" discloses a technology that detects a location of a mobile node by using information on a strength of a received signal transmitted from one or more reference nodes to a mobile node.

Further, Korean Patent Publication No. 2014-0066570 titled "System and Method for Navigation" discloses a technology that attaches a barcode including identification information to a predetermined point indoors and determines a location of a user in an indoor map by detecting the barcode.

As described above, various technologies for accurately detecting the location of the user positioned in a building are proposed.

However, since the location detection technology can determine only at which location the user is positioned in an indoor space and cannot determine in which direction the user views at the location.

SUMMARY

The principal object of the embodiments herein is to provide a pose detection device of a movable body and a location based supplemental service providing system which can accurately determine the pose (e.g., a viewing direction) of the movable body by using a polarized light characteristic and provide a location based service based on the determined pose of the movable body.

In order to achieve the technical object, a pose detection device of a movable body and a location based supplemental service providing system is described.

Accordingly, embodiments herein provide a pose detection device for a movable body. The pose detection device includes a first polarization unit and a second polarization unit positioned to have transmission axis difference values different from each other, wherein the first polarization unit and the second polarization unit receiving light emitted from a polarized light source located beyond and apart from the first polarization unit and the second polarization unit. Further, the pose detection device includes a first illuminometer measures positioned below the first polarization unit and a second illuminometer positioned below the second polarization unit. Further, the pose detection device includes an interpretation unit generating pose information of the movable body based on detected light variation curves for the first polarization unit and the second polarization unit and illumination values measured by the first illuminometer and the second illuminometer.

In an embodiment, the interpretation unit calculates a reference transmission axis difference value between a reference polarization unit provided in the polarized light source and the first polarization unit based on the illumination values.

In an embodiment, the interpretation unit detects a viewing direction of the movable body based on the reference transmission axis difference value when a reference transmission axis of the reference polarization unit positioned to coincide with a predetermined direction.

In an embodiment, the interpretation unit detects a phase angle at which at least one point where the illumination value depending on the first illuminometer crosses the detected light variation curves depending on the first polarization unit, and at least one point where the illumination value depending on the second illuminometer crosses the detection light variation curve depending on the second polarization unit, wherein the phase angle is commonly positioned at an $n+1^{th}$ pose detection time and compares the detected phase angle with the phase angle detected at an $n^{th}$ pose detection time to generate rotational information of the movable body.

In an embodiment, when a plurality of phase angles is detected at the $n+1^{th}$ pose detection time, a phase angle having a phase difference of 180 degrees or less from the phase angle detected at the $n^{th}$ pose detection time is selected.

Accordingly, embodiments herein provide a location based supplemental service system of a movable body. The system includes a pose detection device generating pose information of the movable body. Further, the system includes an indoor localization system generating location information regarding a geographical location of the movable body in an indoor space. Further, the system includes a supplemental service device providing the pose information and predetermined location based information which coincides with the location information to the movable body. The pose detection device includes a first polarization unit and a second polarization unit positioned to have transmission axis difference values different from each other, wherein the first polarization unit and the second polarization unit receiving light emitted from a polarized light source located beyond and apart from the first polarization unit and the second polarization unit. Further, the pose detection device includes a first illuminometer installed below the first polarization unit and a second illuminometer installed below the second polarization unit. Further, the pose detection device includes an interpretation unit generating pose information of the movable body based on detected light variation curves for the first polarization unit and the second polarization unit and illumination values measured by the first illuminometer and the second illuminometer.

In an embodiment, the interpretation unit calculates a reference transmission axis difference value between a reference polarization unit provided in the polarized light source and the first polarization unit based on the illumination values.

In an embodiment, the interpretation unit detects a viewing direction of the movable body based on the reference transmission axis difference value when a reference transmission axis of the reference polarization unit positioned to coincide with a predetermined direction.

In an embodiment, the interpretation unit detects a phase angle at which at least one point where the illumination value depending on the first illuminometer crosses the detected light variation curves depending on the first polarization unit, and at least one point where the illumination value depending on the second illuminometer crosses the detection light variation curve depending on the second polarization unit, wherein the phase angle is commonly positioned at an $n+1^{th}$ pose detection time and compares the detected phase angle with the phase angle detected at an $n^{th}$ pose detection time to generate rotational information of the movable body.

In an embodiment, when a plurality of phase angles is detected at the $n+1^{th}$ pose detection time, a phase angle having a phase difference of 180 degrees or less from the phase angle detected at the $n^{th}$ pose detection time is selected.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1:
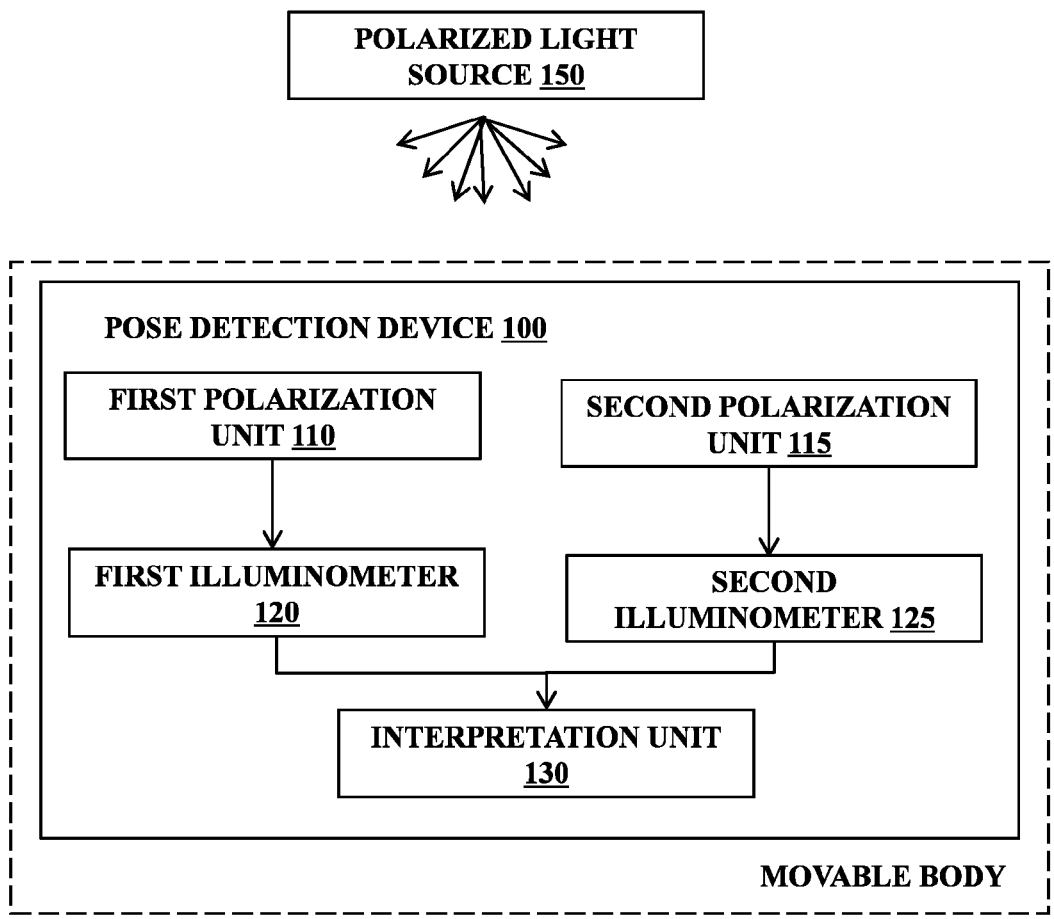
FIG. 1 is a block diagram illustrating a configuration of a pose detection device for detecting a pose of a movable body, according to embodiments as disclosed herein.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments.

Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

For reference, in the present specification, 'pose' may non-exclusively refer to include a rotation state indicating which direction or location the movable body views.

Embodiments herein disclose a pose detection device for a movable body. The pose detection device includes a first polarization unit and a second polarization unit positioned to have transmission axis difference values different from each other, wherein the first polarization unit and the second polarization unit receiving light emitted from a polarized light source located beyond and apart from the first polarization unit and the second polarization unit. Further, the pose detection device includes a first illuminometer measures positioned below the first polarization unit and a second illuminometer positioned below the second polarization unit. Further, the pose detection device includes an interpretation unit generating pose information of the movable body based on detected light variation curves for the first polarization unit and the second polarization unit and illumination values measured by the first illuminometer and the second illuminometer.

Embodiments herein disclose a location based supplemental service system of a movable body. The system includes a pose detection device generating pose information of the movable body. Further, the system includes an indoor localization system generating location information regarding a geographical location of the movable body in an indoor space. Further, the system includes a supplemental service device providing the pose information and predetermined location based information which coincides with the location information to the movable body. The pose detection device includes a first polarization unit and a second polarization unit positioned to have transmission axis difference values different from each other, wherein the first polarization unit and the second polarization unit receiving light emitted from a polarized light source located beyond and apart from the first polarization unit and the second polarization unit. Further, the pose detection device includes a first illuminometer installed below the first polarization unit and a second illuminometer installed below the second polarization unit. Further, the pose detection device includes an interpretation unit generating pose information of the movable body based on detected light variation curves for the first polarization unit and the second polarization unit and illumination values measured by the first illuminometer and the second illuminometer.

Unlike conventional systems and methods, the pose detection device and the location based supplemental service providing system are simple and robust to effectively detect the pose of the movable body and provide location-based services based on the pose information of the movable body. The location based supplemental service providing system is used to accurately determine the pose information of the movable body. Further, accurate location based services are provided based on the determined pose of the movable body.

Referring now to the drawings and more particularly to FIGS. 1 to 4 where similar reference characters denote corresponding features consistently throughout the figures, there are shown preferred embodiments.

FIG. 1 is a block diagram illustrating a configuration of a pose detection device 100 for detecting a pose of a movable body, according to embodiments as disclosed herein. In an embodiment, the pose detection device 100 is configured to include a first polarization unit 110, a second polarization unit 115, a first illuminometer 120, a second illuminometer 125, and an interpretation unit 130. The pose detection device 100 communicates with a polarized light source 150.

The polarized light source 150 described herein acts as means for irradiating polarized light may be configured to include a polarization unit and a light source.

The polarized light source 150 may be implemented by, for example, a light source body to which a polarization film is attached, a light source body in which a polarization lamp and a polarization filter are installed, or the like. The polarization unit (that is, a member such as a polarization film, or the like provided for polarization processing) provided in the polarized light source 150 may be referred to as a 'reference polarization unit' for distinguishing from the first polarization units 110 and the second polarization units 115. Further, the light source may be a light device disposed on the top of an indoor space.

In this case, the reference polarization unit may be installed so that a transmission axis which coincides with a predetermined orientation (e.g., a direction of a phase angle of 0 degree as a due north direction) is formed. In this case, when it is accurately detected which degree of transmission axis difference value the first polarization unit 110 has from the reference polarization unit, it may be easily determined in which direction the movable body rotates.

In an embodiment, the pose detection device 100 may be formed at or attached onto one side of the movable body in order to detect a pose of the movable body. However, when the pose detection device 100 is provided at one side of the movable body, the pose detection device 100 is disposed at a location in which light may flow from the polarized light source 150.

In the FIG. 1, a case is illustrated, in which the interpretation unit 130 generating information on the pose of the movable body is included in the pose detection device 100, but the interpretation unit 130 may be included in an independent device which the pose detection device 100 accesses through a communication network. In such case, the pose detection device 100 will include a transmitting unit (not shown) for transmitting illumination value information measured by the first illuminometer 120 and the second illuminometer 125 to a device including the interpretation unit 130. However, in an embodiment, a component including the first polarization unit 110, the second polarization unit 115, the first illuminometer 120, the second illuminometer 125, and the interpretation unit 130 will be referred to as the pose detection device 100 regardless of a location of the interpretation unit 130.

Each of the first polarization unit 110 and the second polarization unit 115 is provided to pass or interrupt the entirety or a part of light which flows in from the polarized light source 150 according to a set of transmission axis. In this case, the first polarization unit 110 and the second polarization unit 115 are installed to have a transmission axis difference value as large as a predetermined angle (e.g., $\pi/4$) of $\alpha$ from each other.

When polarized light flows in the first polarization unit 110 and the second polarization unit 115, which is parallel to the transmission axis installed from the polarized light source 150, the first polarization unit 110 and the second polarization unit 115 will function to pass all of the polarized light. When the polarized light vertical to the transmission axis flows in, the first polarization unit 110 and the second polarization unit 115 will function to absorb the whole polarized light.

The first polarization unit 110 and the second polarization unit 115 may be, for example, at least one of a polarization film, a polarization filter, or the like similarly to the reference polarization unit.

The first illuminometer 120 is disposed below the first polarization unit 110 and the second illuminometer 125 is disposed below the second polarization unit 115, and as a result, the first illuminometer 120 and the second illuminometer 125 calculate illumination values acquired by measuring illumination of the light passed through the first polarization unit 110 or the second polarization unit 115, respectively.

The interpretation unit 130 generates interpretation information on the pose (e.g., the viewing direction) of the movable body by using the illumination values emitted from the polarized light source 150, passing through the first polarization unit 110 and the second polarization unit 115, and measured by the first illuminometer 120 and the second illuminometer 125.

Although not illustrated, the pose detection device 100 may further include a storage unit for storing information on a detection light variation curve depending on the first and second polarization units 110 and 115 and a difference value on the transmission axis between the reference polarization unit and the first polarization unit 110, which is calculated at each time for interpreting the pose of the movable body.

The storage unit may include one or more computer-readable storage media. The storage unit may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the storage unit may, in some examples, be considered a non-transitory storage medium. The term "non-transitory" may indicate that the storage medium is not embodied in a carrier wave or a propagated signal. However, the term "non-transitory" should not be interpreted that storage unit is non-movable. In some examples, the storage unit can be configured to store larger amounts of information than the memory. In certain examples, a non-transitory storage medium may store data that can, over time, change (e.g., in Random Access Memory (RAM) or cache).

The FIG. 1 shows a limited overview of the pose detection device 100 but, it is to be understood that other embodiments are not limited thereto. Further, the pose detection device 100 can include any number of units along with other hardware and software components communicating locally or remotely with each other to detect the pose of the movable body. The names and labels of the units are only for illustrative purpose and does not limit the scope of the invention. It is to be understood that the one or more units can be combined together to perform same or substantially similarly features as described herein without departing from the scope of the invention.

Hereinafter, a method in which the pose detection device 100 generates interpretation information on the pose of the movable body will be described in detail with reference to FIGS. 2 and 3.

Figure 2:
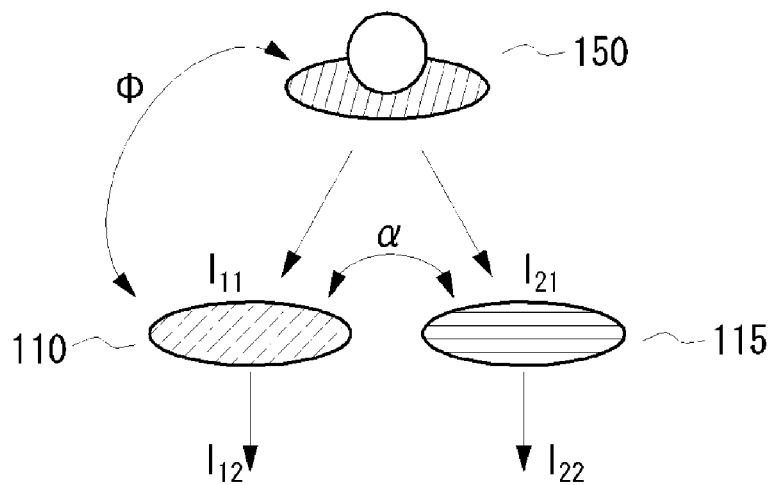
FIGS. 2 and 3 illustrates a pose detection technique, according to embodiments as disclosed herein.
Figure 3:
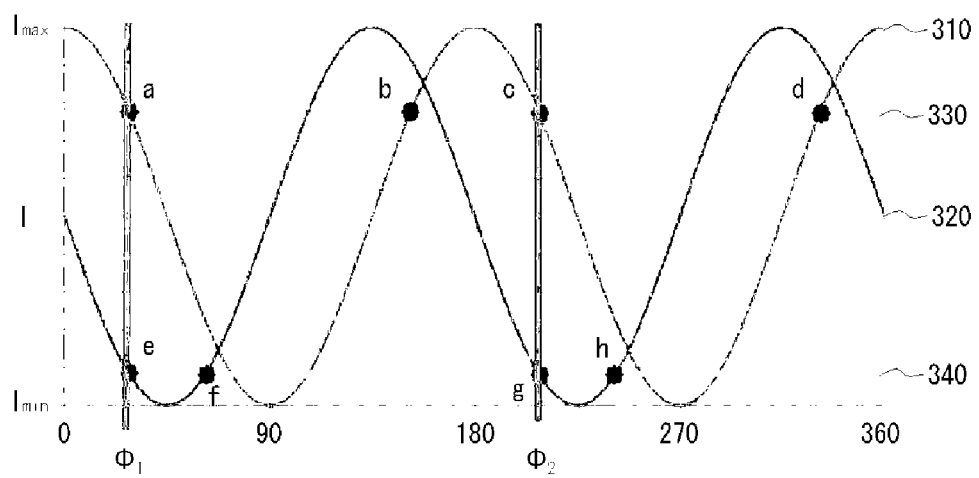

As illustrated in the FIG. 2, each of the first polarization unit 110 and the second polarization unit 115 is installed to have the transmission axis difference value as large as the predetermined a. Herein, it is described that a which is the transmission axis difference value between the first and second polarization units 110 and 115 is π/4 as an example for easy description.

In an embodiment, when a Malus's law is used with respect to each of the first polarization unit 110 and the second polarization unit 115, the transmission axis difference value Φ between the first polarization unit 110 and the reference polarization unit in a current location is calculated. A current pose of the movable body may be calculated as presented in Equations 1 to 4 given below.

$$I_{12} = I_{11}\cos^2\phi.$$ [Equation 1]

$$I_{22} = I_{21}\cos^2\left(\phi + \frac{\pi}{4}\right)$$

The Equation 1 shows a Malus' law for each of the first polarization unit 110 and the second polarization unit 115, $I_{11}$ represents an illumination measurement value before passing through the first polarization unit 110, $I_{12}$ represents the illumination measurement value (that is, the illumination value measured by the first illuminometer 120) after passing through the first polarization unit 110, $I_{21}$ represents the illumination measurement value before passing through the second polarization unit 115, and $I_{22}$ represents the illumination measurement value (that is, the illumination value measured by the second illuminometer 125) after passing through the second polarization unit 115.

A ratio of $I_{12}$ and $I_{22}$ presented in Equation 1 may be organized by an equation of tan Φ using Φ which is the transmission axis difference value between the first polarization unit 110 and the reference polarization unit as presented in Equation 2 given below. When it is considered that the first polarization unit 110 and the second polarization unit 115 are disposed with a distance very close to each other, $I_{21}/I_{11}$ which is a ratio of the illumination measurement values measured above the first and second polarization units 110 and 115 may be approximated to 1.

$$\frac{I_{22}}{I_{12}} =$$ [Equation 2]

$$\frac{I_{21}}{I_{11}}\frac{\cos^2\left(\phi + \frac{\pi}{4}\right)}{\cos^2\phi} = \frac{\left[\frac{\sqrt{2}}{2}(\cos\phi - \sin\phi)\right]}{\cos^2\phi} = \frac{1}{2}(1 - \tan\phi)^2$$

$$\frac{2I_{22}}{I_{12}} = (1 - \tan\phi)^2$$ [Equation 3]

$$\phi = \begin{cases} \arctan\left(1 - \sqrt{\frac{2I_{22}}{I_{12}}}\right) & (\tan\phi \le 1) \\ \arctan\left(1 + \sqrt{\frac{2I_{22}}{I_{12}}}\right) & (\tan\phi > 1) \end{cases}$$ [Equation 4]

As described above, the ratio of the illumination measure value after passing through two polarization units mounted on the movable body is calculated as arctan Φ to calculate the transmission axis difference value Φ between the first polarization unit 110 and the reference polarization unit.

In an embodiment, a variation curve of a light amount detected by the first illuminometer 120 and the second illuminometer 125 disposed below the first polarization unit 110 and second polarization unit 115 attached to the movable body may be expressed as shown in the FIG. 3, according to the Malus' law. For reference, the light amount variation curve illustrated in the FIG. 3 shows a case in which the first polarization unit 110 and the second polarization unit 115 are installed to have the transmission axis difference value of π/4.

That is, when the transmission axis of the first polarization unit 110 is ideally parallel to the reference polarization unit, the variation curve of the light amount has a period of it as a cosine waveform having a maximum light amount $I_{max}$ at rotational angles of 0 and 180 degrees and a minimum light amount $I_{min}$ at the rotational angles of 90 and 270 degrees at which respective transmission axes are orthogonal to each other. For reference, reference numeral 310 represents a variation curve of the light amount detected by the first illuminometer 120, reference numeral 320 represents the variation curve of the light amount detected by the second illuminometer 125 and the illumination values measured by the first illuminometer 120 and the second illuminometer 125, respectively at a specific time are represented by reference numerals 330 and 340.

A first cross point group of the light amount variation curve 310 of the first polarization unit 110 and the illumination value 330 measured by the first illuminometer 120 at the specific time includes 4 cross points (that is, a, b, c, and d) and a second cross point group of the light amount variation curve 320 of the first polarization unit 115 and the illumination value 340 measured by the second illuminometer 125 at the specific time also includes 4 cross points (that is, e, f, g, and h).

As described above, when only any one of the first polarization unit 110 and the second polarization unit 115 is considered, 4 cross points are shown, and as a result, it may be unclear to discriminate left and right sides in tracking the pose of the movable body and it may be difficult to determine the direction.

Therefore, the pose detection device 100 according to the exemplary embodiment is used by installing the first polarization unit 110 and the second polarization unit 115 which are two polarization units. As a result, the number of cross points which exist in two light amount variation curves at the same phase angle (that is, Φ1 and Φ2) decreases as two (that is, a and e and c and g and the two cross points have the angular difference as large as π). In general, assuming that the movable body does not rapidly change the direction at π (that is, 180 degrees) or larger, it may be detected at which angle and in which direction the movable body rotates as a difference from the previous transmission axis difference value.

For example, when it is detected that Φ0 which is the transmission axis difference value at an initial time when the pose of the movable body is detected is 10 degrees and thereafter, it is calculated that Φ1 which is the transmission axis difference value calculated at a next time is 40 degrees and Φ2 is (π+40 degrees), it may be detected that the transmission axis difference value at the corresponding time is 40 degrees and the interpretation unit 130 may detect that the movable body rotates at 30 degrees clockwise. In order to calculate a rotational angle variation amount at the pose detection time at every time, the transmission axis difference value calculated at every time or at the previous time may be stored and managed in a storage unit (not illustrated).

Figure 4:
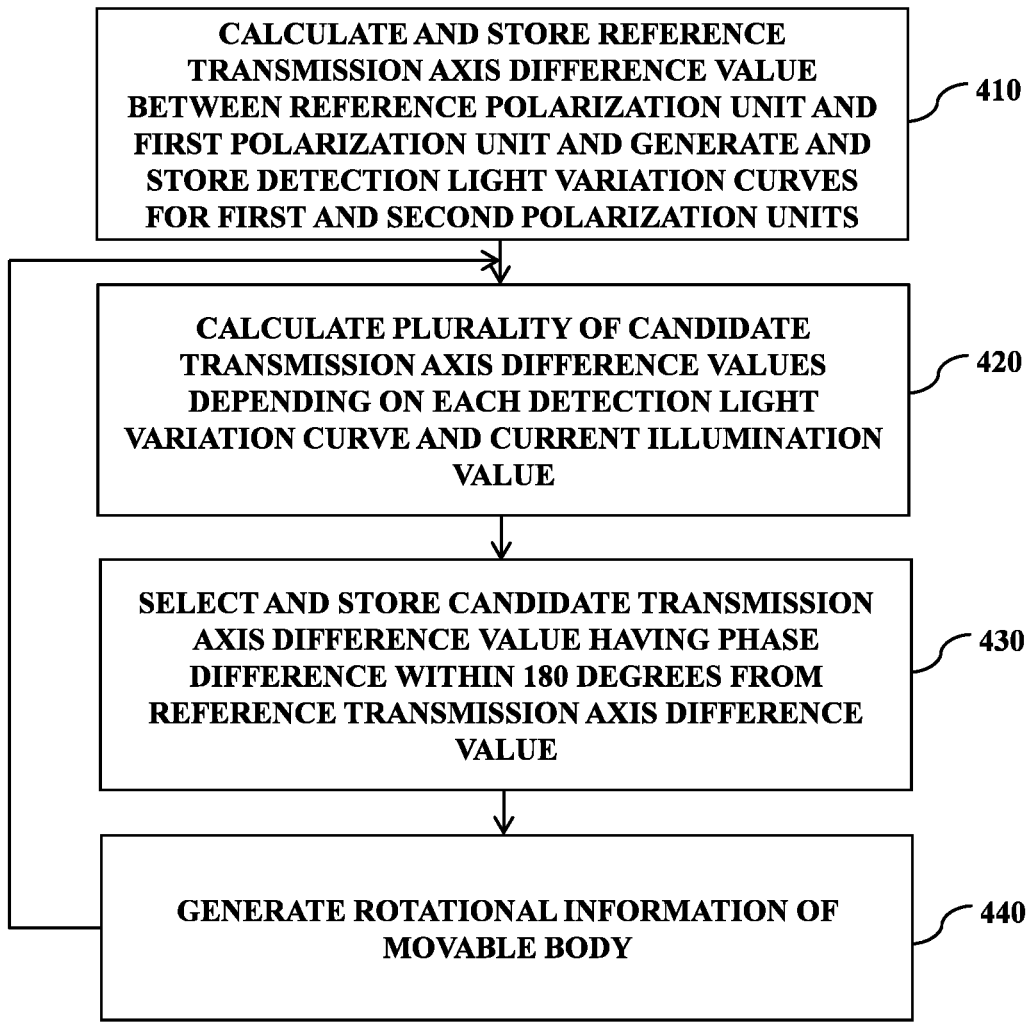
FIG. 4 is a flowchart illustrating a method for detecting a pose of a movable body, according to embodiments as disclosed herein.

FIG. 4 is a flowchart illustrating a method for detecting a pose of a movable body, according to embodiments as disclosed herein.

Referring to FIG. 4, in an embodiment, at step 410, a pose detection device 100 calculates and stores a reference transmission axis difference value Φ between a reference polarization unit and a first polarization unit 110. A reference transmission axis difference value between the reference polarization unit and the first polarization unit 110 may be calculated by referring to the Equations 1 to 4 described above. When the transmission axis of the reference polarization unit is installed to coincide with a predetermined orientation, it may be easily interpreted which direction the movable body takes a pose of viewing at present by using the reference transmission axis difference value.

at step 410, the pose detection device 100 generates and stores a detection light variation curve for each of the first polarization unit 110 and the second polarization unit 115 by using light transmission characteristics of the first polarization unit 110 and the second polarization unit 115 receiving light emitted from a polarized light source 150.

At step 420, the pose detection device 100 calculates a plurality of candidate transmission axis difference values corresponding to phase angles at cross points where illumination values measured by the first illuminometer 120 and the second illuminometer 125 and a detection light variation curves generated are commonly positioned at a present time.

At step 430, the pose detection device 100 selects and stores the reference transmission axis difference value (that is, a difference value between the reference transmission axis difference value calculated in step 410 or a candidate transmission axis difference value finally selected during the previous post detection process) among the calculated plurality of candidate transmission axis difference values, and a candidate transmission axis difference value having a phase difference within 180 degrees.

At step 440, the pose detection device 100 generates rotational information (e.g., a rotation direction and a rotational angle) of the movable body by using a phase difference between the candidate transmission axis difference value selected at step 430 and the reference transmission axis difference value.

The various steps described in the flowchart may be performed in the order presented, in a different order or simultaneously. Further, in some embodiments, some of the steps may be omitted, added, modified, skipped, or the like without departing from the scope of the invention.

Figure 5:
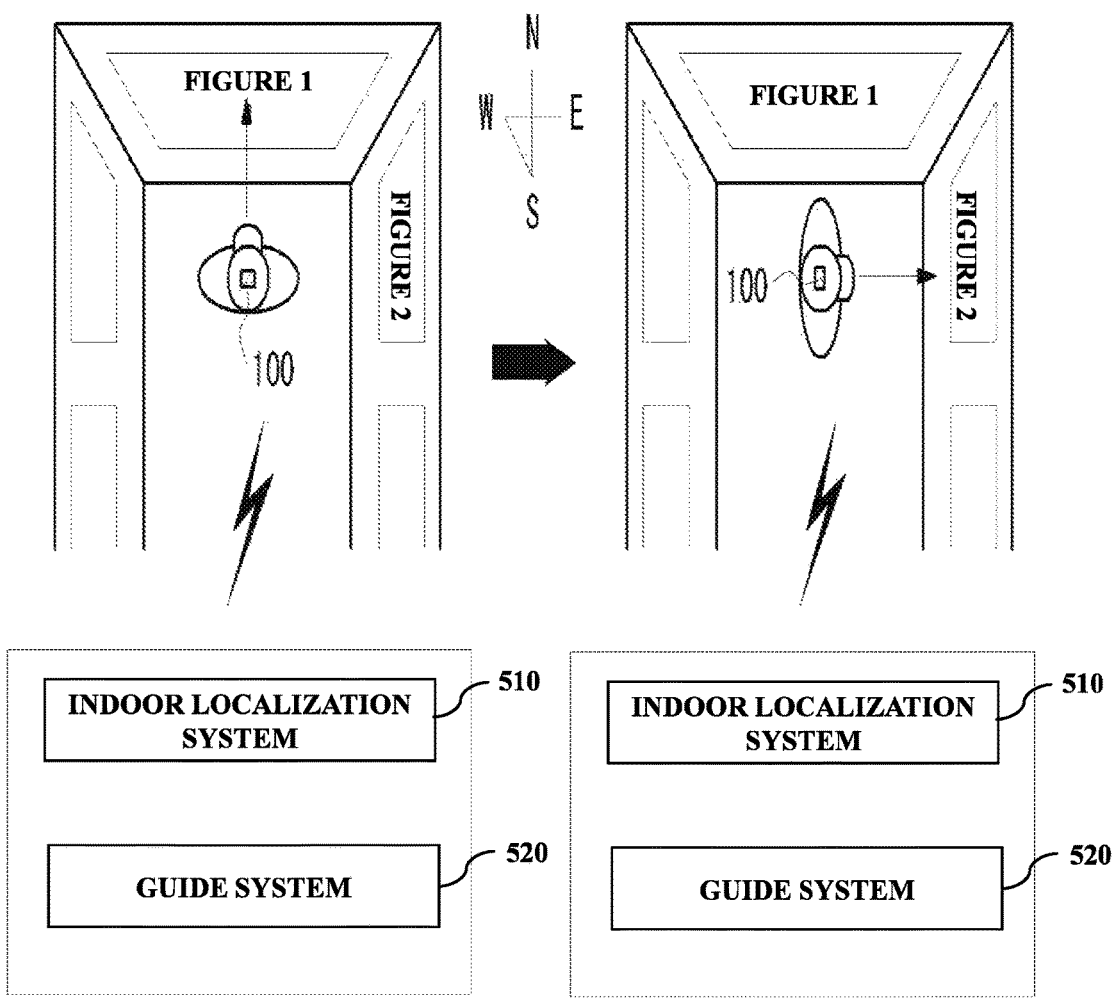
FIG. 5 is a diagram illustrating a location based supplemental service providing system using a pose detection device of a movable body, according to embodiments as disclosed herein.

FIG. 5 is a diagram illustrating a location based supplemental service providing system using the pose detection device 100 of the movable body, according to embodiments as disclosed herein. The FIG. 5, which relates to the location based supplemental service which is an exhibit introduction service corresponding to a viewing direction of a visitor which visits an exhibit hall, is a diagram for describing a case in which the pose detection device 100 is attached to the top of a hat which the visitor wears as an example.

As illustrated in the FIG. 5, the pose detection device 100 may include an indoor localization system 510 for specifying a location of the visitor in order to provide the location based supplemental service for the visitor and a guide system 520 for providing the visitor with the supplemental service information which coincides with a location of a visitor specified by the indoor localization system 510 and a pose (e.g., a viewing direction) of the visitor specified by the pose detection device 100.

The indoor localization system 510 as a system for specifying a geographical location of a visitor positioned in an indoor space, may be a system using a received signal strength detected by communication equipment of the visitor as described above (see Korean Patent Unexamined Publication No. 2014-0055109, or the like) or using a barcode including identification information attached to a predetermined point (see Korean Patent Unexamined Publication No. 2014-0066570, or the like). Further, it is apparent to those skilled in the art that the system for specifying the geographical location of the visitor in the indoor space can be variously configured.

The guide system 520 includes a database storing location based information to be provided to the visitor to coincide with geographical location and pose information of the visitor and transmits corresponding location based information to the visitor by receiving geographical location information and the pose information from the indoor localization system 510 and the pose detection device 100.

For example, the guide system 520 may detect that there is no change in geographical location between FIGS. 5A and 5B, but the movable body rotates so that only the pose views the east from the north by referring to the geographical location and pose information from the indoor localization system 510 and the pose detection device 100 and transmit to the visitor respective different location based information (that is, description information for a figure displayed in the viewing direction).

The visitor may include communication equipment that receives and outputs the location based information from and to the guide system 520 other than the pose detection device 100. An output method of the location based information may include various methods including a visual processing method, an auditory processing method, and the like.

It is natural that the pose detection method may be performed by an automated procedure according to a time series order by a program embedded or installed in a digital processing device, or the like. Codes and code segments constituting the program may be easily inferred by a computer programmer in the art. Further, the program is stored in computer readable media which the digital processing device may read and executed by the digital processing device to implement the method. The information storage medium includes a magnetic storage medium, an optical storage medium, and a carrier wave medium.

The present invention has been described with reference to the exemplary embodiments. However, it will be appreciated by those skilled in the art that various modifications and changes of the present invention can be made without departing from the spirit and the scope of the present invention which are defined in the appended claims.

What is claimed is:

1. A pose detection device for a movable body, the pose detection device comprising:
   a first polarization unit and a second polarization unit positioned to have transmission axis difference values different from each other, wherein the first polarization unit and the second polarization unit receiving light emitted from a polarized light source located beyond and apart from the first polarization unit and the second polarization unit;
   a first illuminometer positioned below the first polarization unit and a second illuminometer positioned below the second polarization unit; and
   an interpretation unit generating pose information of the movable body based on detected light variation curves for the first polarization unit and the second polarization unit and illumination values measured by the first illuminometer and the second illuminometer;
   wherein the interpretation unit detects a phase angle at which at least one point where the illumination value depending on the first illuminometer crosses the detected light variation curves depending on the first polarization unit, and at least one point where the illumination value depending on the second illuminometer crosses the detection light variation curve depending on the second polarization unit, wherein the phase angle is commonly positioned at an $n+1^{th}$ pose detection time and compares the detected phase angle with the phase angle detected at an $n^{th}$ pose detection time to generate rotational information of the movable body.

2. The device of claim 1, wherein the interpretation unit calculates a reference transmission axis difference value between a reference polarization unit provided in the polarized light source and the first polarization unit based on the illumination values.

3. The device of claim 2, wherein the interpretation unit detects a viewing direction of the movable body based on the reference transmission axis difference value when a reference transmission axis of the reference polarization unit positioned to coincide with a predetermined direction.

4. The device of claim 1, wherein when a plurality of phase angles is detected at the $n+1^{th}$ pose detection time, a phase angle having a phase difference of 180 degrees or less from the phase angle detected at the $n^{th}$ pose detection time is selected.

5. A location based supplemental service system of a movable body, the system comprising:
   a pose detection device generating pose information of the movable body;
   an indoor localization system specifying a geographical location of the movable body in an indoor space; and
   a guide system providing the pose information and predetermined location based information which coincides with the specified geographic location to the movable body,
   wherein the pose detection device includes:
       a first polarization unit and a second polarization unit positioned to have transmission axis difference values different from each other, wherein the first polarization unit and the second polarization unit receiving light emitted from a polarized light source located beyond and apart from the first polarization unit and the second polarization unit;
       a first illuminometer installed below the first polarization unit and a second illuminometer installed below the second polarization unit, and
       an interpretation unit generating pose information of the movable body based on detected light variation curves for the first polarization unit and the second polarization unit and illumination values measured by the first illuminometer and the second illuminometer;
   wherein the interpretation unit detects a phase angle at which at least one point where the illumination value depending on the first illuminometer crosses the detected light variation curves depending on the first polarization unit, and at least one point where the illumination value depending on the second illuminometer crosses the detection light variation curve depending on the second polarization unit, wherein the phase angle is commonly positioned at an $n+1^{th}$ pose detection time and compares the detected phase angle with the phase angle detected at an $n^{th}$ pose detection time to generate rotational information of the movable body.

6. The system of claim 5, wherein the interpretation unit calculates a reference transmission axis difference value between a reference polarization unit provided in the polarized light source and the first polarization unit based on the illumination values.

7. The system of claim 6, wherein the interpretation unit detects a viewing direction of the movable body based on the reference transmission axis difference value when a reference transmission axis of the reference polarization unit positioned to coincide with a predetermined direction.

8. The system of claim 5, wherein when a plurality of phase angles is detected at the $n+1^{th}$ pose detection time, a phase angle having a phase difference of 180 degrees or less from the phase angle detected at the $n^{th}$ pose detection time is selected.

* * * * *